(12) United States Patent
Lee et al.

(10) Patent No.: US 6,782,127 B1
(45) Date of Patent: Aug. 24, 2004

(54) METHOD OF QUANTIZATION IN COLOR SPACE

(75) Inventors: Jin Soo Lee, Seoul (KR); Hyeon Jun Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 592 days.

(21) Appl. No.: 09/589,890

(22) Filed: Jun. 9, 2000

(30) Foreign Application Priority Data

Jun. 10, 1999 (KR) .......................................... 1999/21577

(51) Int. Cl.⁷ ............................ G06K 9/38; G09G 5/02
(52) U.S. Cl. ........................ 382/166; 345/591; 345/600
(58) Field of Search ................................ 382/162, 166, 382/167; 358/1.9, 518, 520; 345/590, 591, 600, 604, 605

(56) References Cited

U.S. PATENT DOCUMENTS

| | | | | |
|---|---|---|---|---|
| 5,237,517 A | * | 8/1993 | Harrington et al. | 382/162 |
| 5,243,414 A | * | 9/1993 | Dalrymple et al. | 358/500 |
| 5,307,088 A | * | 4/1994 | Inuzuka et al. | 345/600 |
| 5,432,893 A | * | 7/1995 | Blasubramanian et al. | 345/600 |
| 5,467,110 A | * | 11/1995 | White et al. | 345/601 |
| 5,537,228 A | * | 7/1996 | Dillinger | 358/502 |
| 5,544,284 A | * | 8/1996 | Allebach et al. | 345/603 |
| 5,596,428 A | * | 1/1997 | Tytgat et al. | 358/518 |
| 5,933,252 A | * | 8/1999 | Emori et al. | 358/500 |
| 6,236,406 B1 | * | 5/2001 | Li | 345/591 |
| 6,310,969 B1 | * | 10/2001 | Kim et al. | 382/162 |

FOREIGN PATENT DOCUMENTS

EP 953941 A2 * 11/1999 ............. G06T/7/40

* cited by examiner

Primary Examiner—Bhavesh M. Mehta
Assistant Examiner—Christopher Sukhaphadhana
(74) Attorney, Agent, or Firm—Fleshner & Kim, LLP

(57) ABSTRACT

A method of quantization a color space is disclosed. In the present invention, a color space is quantized differently depending upon the chroma value,

19 Claims, 2 Drawing Sheets

METHOD OF QUANTIZATION IN COLOR SPACE

BACKGROUND OF THE INVENTION

1. Field of the Invention

The present invention relates to a method of quantizing a color space, and more particularly, to a method of quantizing a HMMD color space.

2. Discussion of the Related Art

Generally, color information is an important information for display of images and for use in applications such as a content based image searching. However, the number of colors which can be displayed by a computer is limited. Therefore, maintaining a number of optimal colors required to store and process data becomes important in displaying colors. Accordingly, quantization maps M number of colors to N number of colors, where M>N, to obtain an optimal number of colors.

In computers, a color is expressed utilizing an RGB color model based upon the three primary colors of red R, green G, and blue B. Because a limitation exists in expressing the color changes such that the change can be sensed by the human eye, the RGB space is often converted into a user oriented HVC color model based upon a hue H, value V, and chroma C then converted back to the RGB space by quantization. Accordingly, various methods utilizing the HVC color space coordinates for a content-based image retrieval engines (or application program) have been provided in the related art.

However, change of color with low chroma such as black, white and gray depends on brightness while change of color with high chroma depends on tint, shade and chroma. Thus, quantization of the HVC performs well within a pure color space having high chroma, but has problems in decolored space having low chroma.

SUMMARY OF THE INVENTION

Accordingly, an object of the present invention is to solve at least the problems and disadvantages of the related art.

An object of the present invention is to provide a quantization method for obtaining an optimal number of colors.

Another object of the present invention is to provide an efficient quantization method for the HMMD color space.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a method of quantization a HMMD color space according to the present invention includes selecting a plurality of parameters defining a three-dimensional color space and linear-quantizing or nonlinear-quantizing the defined color space based on at least one of the selected parameters.

Another embodiment of the method for quantization a HMMD color space according to the present invention includes determining a parameter for linear-quantizing or nonlinear-quantizing of a color space based on a boundary threshold value.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

Generally, the quantization method according to the present invention uniformly distributes all color regions and color changes within the color by using a HMMD color space. The HMMD color space is disclosed in copending application 09/239,773, U.S. Pat. No. 6,633,407, entitled "HMMD Color Space and Method for Quantizing Color Using HMMD Space and Color Spreading," and is fully incorporated herein. Essentially, the HMMD color model is defined by a hue, a shade (max), and a tint (min), a tone or chroma (diff), and a brightness (sum). These five parameters are the three dimensional coordinate axis for the HMMD color space. The hue indicates the color such as red, yellow, green blue and purple; the tint indicates how close a color is to white; the chroma indicates how pure a color is; and the shade indicates how close a color is to black.

Figure 1:
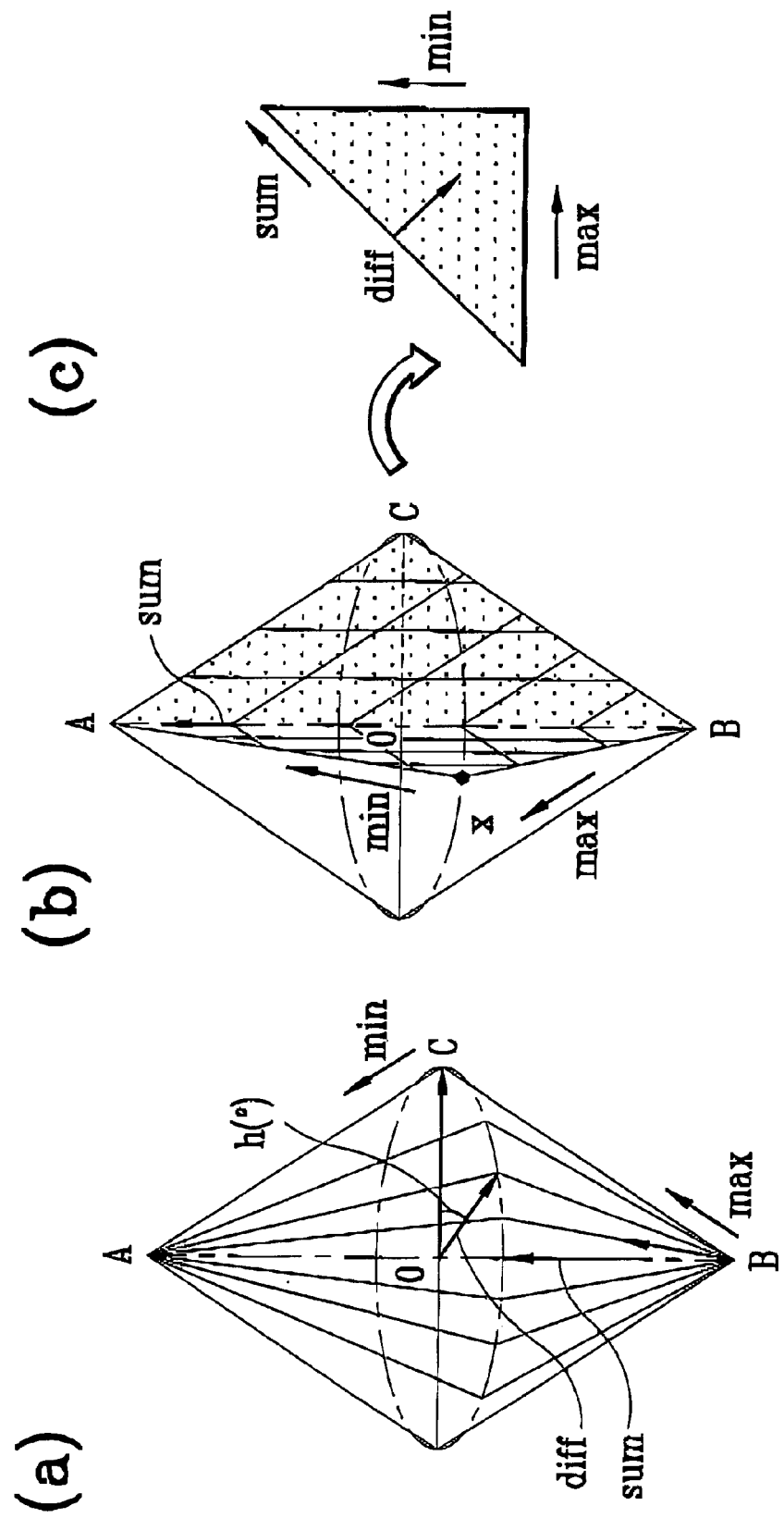
FIGS. 1a and 1b show a HMMD color coordinate space according to the present invention.
FIG. 1c shows a plane of a HMMD color coordinate space according to the present invention.

FIGS. 1a and 1b show a HMMD model having the shape of two symmetrical cones being merged at the flat surfaces. Particularly, the three dimensional color space is formed by the hue h° having an angle θ of 0°~360° around the AB axis; the chroma diff being a normal vector in the direction from the center point 0 to the maximum circumference C; the shade max being a vector in the direction from the apex B to the maximum circumference C; and the tint min being a vector in the direction from the apex A to the maximum circumference C.

Also, a normal plane passing through a sum vector from apex B to apex A and having a boundary defined by the two apex A and B, and a point on the maximum circumference becomes a color plane, as shown in FIG. 1c, including the sum, the max, the min and the diff. Note that the center line is the sum of the max and min vectors (sum). Moreover, the sum expresses the brightness of a color changing from black to white.

One color plane displays the max, the min, the diff, and the sum at a given hue θ°, and may be represented by a 2-dimensional it plane or a triangle connecting three angular points expressing black, white and pure color. Particularly, the max value controls the color shade and changing the max value changes the shade from black to either white or pure color. The min value controls the tint and changing the min value changes the tint from white to either black or pure color. The diff value controls the tone and changing the diff value changes the tone from gray to a pure color.

Particularly, the hue, the max, the min, the diff, and the sum are obtained from the three parameters r, g and b of an RGB color space, as follows.

max=MAXIMUM{r, g, b}
min=MINIMUM{r, g, b}
diff=max−min
sum=(max+min)/2
hue=undefined if Max=Min
  (g−b)*60/(max−min), if(r=max ∩ (g−b)≧0)
  360+(g−b)*60/(max−min ), if(r=max ∩ (g−b)<0)
  120+(b−r)*60/ (max−min), if (g=max)
  240+(r−g)*60/(max−min), otherwise.

Accordingly, in the present quantization method, a HMMD color space is quantized differently depending upon the value of chroma. Namely, a region of the HMMD color space where the chroma is less or equal to a boundary threshold value is quantized based upon hue, brightness, and chroma. The remaining region of the HMMD color space, i.e. where the chroma is greater than the boundary threshold value, is quantized based on hue, tint, chroma, and shade.

The HMMD color space is quantized differently because a change of color in regions with low color or low chroma such as black, white, and gray depend on brightness. In contrast, a change of color in a more pure color region with high color or high chroma depends on tint, shade and chroma. Here, the parameter which divides and determines the type of quantization for the HMMD color space is the boundary threshold value Thres_Chroma, which is predetermined value depending upon the application and image. For example, if the value of diff ranges from 0 to 255, the Thres_Chroma may be set to a value of 100.

Figure 2:
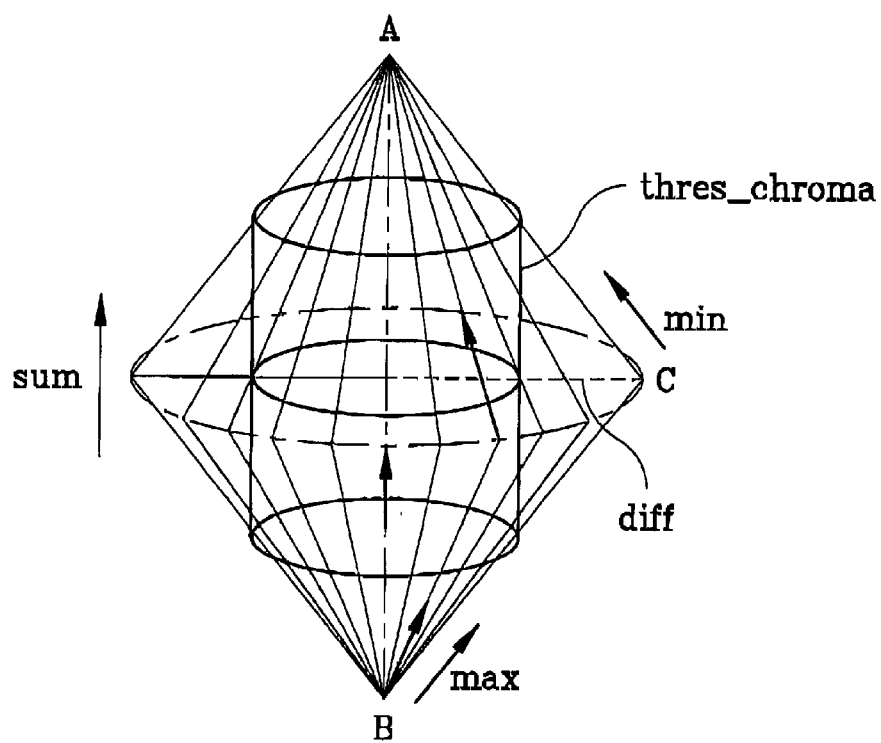
FIG. 2 shows a HMMD color coordinate space divided based on a boundary threshold value, according to one embodiment of the present invention.

As shown in FIG. 2, the boundary threshold value Thres_Chroma divides the HMMD color space into a cylindrical shaped body with a conical top and bottom, and a pointed perimeter region with a cylindrical hole. If diff, i.e. chroma, is lower or equal to Thres_Chroma, the HMD color space is within the cylindrical shaped color region and is quantized based upon hue, sum, and diff. Otherwise, if diff is higher than Thres_Chroma, the HMMD color space is within the pointed perimeter region and is quantized based on hue, max, min, and diff.

Here, the quantization may be either linear quantization or nonlinear quantization. Also, the cylindrical shaped color region may be quantized using a set of parameters other than hue, sum, and diff, as long as the sum parameter is used. Likewise, the pointed perimeter region may be quantized using a set of parameters other than hue, max, min, and diff. Therefore, in the present invention, the HMMD color space is quantized using a different set of parameters, depending upon the value of diff.

Figure 3:
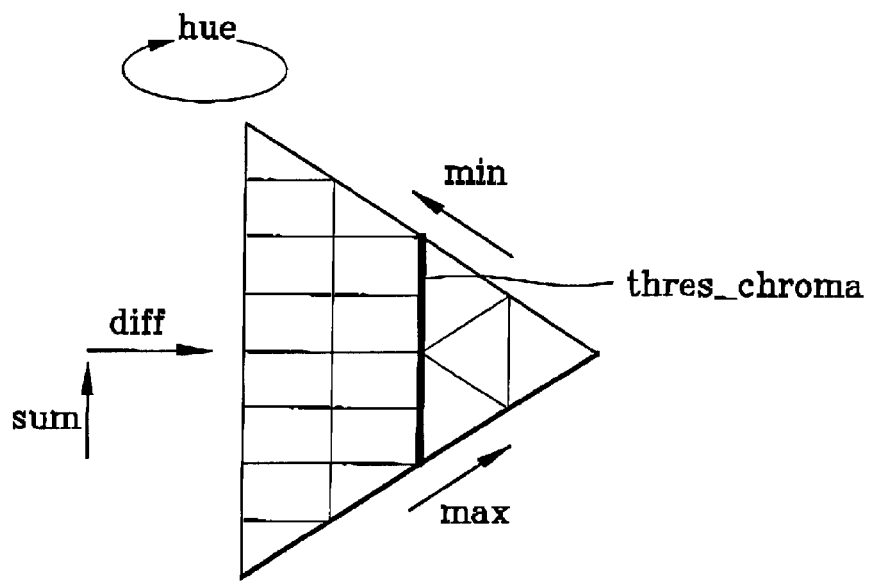
FIG. 3 shows a plane of a HMMD color coordinate space divided based on the boundary threshold value, according to one embodiment of the present invention.

FIG. 3 shows a slice of color space divided with respect to one value of hue according to the present invention. Referring to FIG. 3, the cylindrical region having diff lower or equal to the threshold value Thres_Chroma is quantized using 12 levels of hue, 2 levels of diff, and 8 levels of sum. The pointed region having diff higher than the threshold value Thres_Chroma is quantized using 24 levels of hue, 2 levels of min, 2 levels of max, and 2 levels of diff.

In sum, five parameters, namely the hue, the tint, the chroma, the shade, and the brightness, are used differently to quantize the HMMD color space depending upon the chroma. By quantizing regions of the HMMD color space differently, the number of bins of a color histogram can be optimized/minimized.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of quantization in a HMMD color space comprising:

(a) quantizing the HMMD color space using a first set of parameters if a parameter is less or equal to a boundary threshold value; and otherwise (b) quantizing the HMMD color space using a second set of parameters, wherein said second set of parameters is different from said first set of parameters wherein the second set of parameters has more parameters than the first set of parameters, wherein the first set of parameters includes at least a sum parameter and is used if a diff parameter is less than or equal to a boundary threshold value, and wherein in (b), quantizing the HMMD color space uses hue, max, min, and diff parameters.

2. The method of claim 1, wherein in (a) quantizing the HMMD color space uses sum, hue, and diff parameters.

3. The method of claim 1, wherein the quantization in (a) and (b) may either be linear or nonlinear.

4. The method of claim 1, wherein the boundary threshold value is predetermined depending upon an application and image.

5. The method of claim 1, wherein in (a), quantizing the HMMD color space uses 12 levels of hue, 2 levels of diff, and 8 levels of sum.

6. The method of claim 1, wherein in (b), quantizing the HMMD color space uses 24 levels of hue, 2 levels of min, 2 levels of max, and 2 levels of diff.

7. The method of claim 1, wherein the second set of parameters is used if the diff parameter is greater than the boundary threshold value.

8. A method of quantization in a HMMD color space comprising:

dividing the HMMD color space into two regions depending upon diff value; and quantizing the two divided regions using different sets of parameters, wherein quantizing the HMMD color space uses sum, hue, and diff parameters if the diff value is less or equal to a boundary threshold value, and quantizing the HMMD color space uses hue, max, min, and diff parameters, otherwise.

9. The method of claim 8, wherein the quantization in (a) and (b) may either be linear or nonlinear.

10. The method of claim 8, wherein the boundary threshold value is predetermined depending upon an application and image.

11. The method of claim 8, wherein quantizing the HMMD color space using 12 levels of hue, 2 levels of diff, and 8 levels of sum if the diff value is less or equal to the boundary threshold value; and quantizing the HMMD color space using 24 levels of hue, 2 levels of min, 2 levels of max, and 2 levels of diff, otherwise.

12. A quantized color space, comprising:

a first color space; and a second color space, wherein the first color space is used at or below a chroma threshold value, and the second color space is used above the chroma threshold value, wherein the first color space includes fewer parameters than the second color space, wherein the quantized color space is a hue, max, min and diff (HMMD) color space.

13. The quantized color space of claim 12, wherein the second color space is quantized based on hue, max, min and diff parameters.

14. The quantized color space of claim 12, wherein the quantized color space is color mapped as a pair of symmetrical cones merged at their flat surfaces, wherein the first color space is mapped as a cylinder within the pair of symmetrical cones, and the second color space is the region outside the first color space within the pair of symmetrical cones.

15. A method of reducing the number of bins of a color histogram, comprising:

using parameters to quantize regions of a color space, wherein the quantized regions are each represented by different parameter sets, wherein a first quantized region of the color space uses sum, hue, and diff parameters if the diff value is less than or equal to a boundary threshold value, and wherein a second quantized region of the color space uses hue, max, min and diff parameters if the diff value is greater than a threshold value.

16. The method of claim 15, wherein each of the different parameter sets have different numbers of parameters from each other of the different parameter sets.

17. The method of claim 15, wherein a first parameter set includes hue, max, min and diff parameters.

18. The method of claim 15, wherein the color space of one of the quantized regions includes 12 levels of hue, 2 levels of diff and 8 levels of sum.

19. The method of claim 15, wherein parameters are used differently for different regions of the color space depending on a level of chroma being above or below threshold levels of chroma.

* * * * *